United States Patent Office 3,522,313
Patented July 28, 1970

3,522,313
1,5,10-DECANETRITHIOL
Jack E. Reece and Donald H. Kubicek, Bartlesville, Okla., assignors to Phillips Petroleum Company, a corporation of Delaware
No Drawing. Filed Feb. 16, 1968, Ser. No. 705,938
Int. Cl. C07c 149/06, 153/07; C08g 23/00
U.S. Cl. 260—609
1 Claim

ABSTRACT OF THE DISCLOSURE 1,5,10-decanetrithiol is prepared by reacting 1,5,9-decatriene with a carbothiolic acid (i.e., thiolacetic acid) to form a novel intermediate, a 1,5,10-decanetriyl triscarbothiolate (i.e., 1,5,10-decanetrithiol acetate), saponifying the intermediate, and thereafter recovering the 1,5,10-decanetrithiol as a product of the process.

BACKGROUND OF THE INVENTION

The crosslinking of polymers with various crosslinking agents is well known in the art as a means to alter the properties of the cured polymer.

THE INVENTION

By the present invention there is provided as a novel crosslinking composition 1,5,10-decanetrithiol and a process for producing same by the saponification of a novel 1,5,10-decanetriyl triscarbothiolate.

Thus an object of the present invention is to provide novel compounds which are useful for the formation of a novel trithiol crosslinking agent.

Another object of the invention is to provide a process for the formation of 1,5,10-decanetrithiol.

Other aspects, objects, and the several advantages of this invention will be apparent from the specification and the appended claims.

According to the present invention 1,5,10-decanetrithiol is produced by reaction of 1,5,9-decatriene with a carbothiolic acid of the formula $$R-\overset{O}{\underset{\|}{C}}-SH$$

wherein R is alkyl, cycloalkyl, aryl or combinations thereof containing from 1 to 20 carbon atoms and thereafter saponifying the resulting reaction mass. If desired the ester can be separated prior to saponification.

Reactions involved in such a process can be represented by the following equations:

thiolate from a carbothiolic acid and a compound containing an olefinic linkage.

Temperatures to be employed in this conversion can include any temperature wherein the reactor contents are maintained substantially completely in a liquid phase. Preferably, temperatures in the range of about 0° C. to about 150° C. are normally employed. Though either superatmospheric or subatmospheric pressures can be employed, atmospheric pressure is normally preferred because of convenience. However, generally, the reaction can be effected at pressures in the range of about 0.01 to about 100 atmospheres.

The reaction should be carried out for sufficient time to effect the degree of conversion desired. Normally, reaction times in the range of about 1 minute to about 24 hours are most suitable.

Either batch or continuous reaction can be used in carrying out the process of this invention.

Diluents that are substantially completely inert to the particular reaction environment employed can also be employed if desired. For example, hydrocarbons that do not contain olefinic unsaturation and that are of suitable molecular weight such as hexane, cyclohexane, dodecane, toluene, benzene, xylene, and the like can be employed. Other diluents such as N-methylpyrrolidone, chloroform, tetrahydropyran, dimethyl sulfoxide, sulfolane, and the like that do not deleteriously affect the conversion reaction can also be employed.

Preferably, at least 3 moles of the carbothiolic acid are employed for each mole of 1,5,9-decatriene though greater or lesser amounts, in the range of about 2 moles of carbothiolic acid to about 20 moles of carbothiolic acid per mole of 1,5,9-decatriene, can be employed.

The carbothiolic acids to be employed can be synthesized by any means known to the art or secured from commercial sources. Many of such carbothiolic acids are available as items of commerce.

1,5,9-decatriene can be synthesized by any means known to the art. Preferably 1,5,9-decatriene is prepared by the reaction of 1,5-cyclooctadiene and ethylene in the presence of a molybdena on alumina catalyst.

The 1,5,10-decanetriyl triscarbothiolate formed by the above conversion can then be saponified by any means known to the art to be effective for the saponification of a conventional hydrocarbyl carbothiolate. This saponification reaction can be effected at any convenient temperature wherein the reactor contents are substantially completely in a liquid phase. Normally, temperatures in the range of about 0 to about 200° C. are employed, though either higher or lower temperatures can also be employed $$H_2C=CH-CH_2-CH_2-CH=CH-CH_2-CH_2-CH=CH_2 + 3R-\overset{O}{\underset{\|}{C}}-SH \longrightarrow$$

$$\begin{array}{c} CH_2-CH_2-CH_2-CH_2-CH-CH_2-CH_2-CH_2-CH_2-CH_2 \\ | \qquad\qquad\qquad\qquad | \qquad\qquad\qquad\qquad\qquad | \\ S \qquad\qquad\qquad\qquad S \qquad\qquad\qquad\qquad\qquad S \\ | \qquad\qquad\qquad\qquad | \qquad\qquad\qquad\qquad\qquad | \\ O=C-R \qquad\qquad O=C-R \qquad\qquad\qquad O=C-R \end{array}$$

$$\begin{array}{c} CH_2-CH_2-CH_2-CH_2-CH-CH_2-CH_2-CH_2-CH_2-CH_2 \\ | \qquad\qquad\qquad\qquad | \qquad\qquad\qquad\qquad\qquad | \\ SH \qquad\qquad\qquad SH \qquad\qquad\qquad\qquad SH \end{array} \leftarrow \text{Base}$$

Examples of suitable carbothiolic acids include: thiolacetic acid (methanecarbothiolic acid), thiolpropionic acid (ethanecarbothioli acid), eicosanecarbothiolic acid, 14-(cyclohexyl)tetradecanecarbothiolic acid, benzenecarbothiolic acid, cyclododecanecarbothiolic acid, and the like.

The conversion of 1,5,9-decatriene and a carbothiolic acid to a 1,5,10-decanetriyl triscarbothiolate can be effected in conventional equipment by any means known to the art for the formation of a hydrocarbyl carboif desired. Atmospheric pressure is normally employed because of convenience. However, either subatmospheric or superatmospheric pressures can also be employed if desired. Generally, however, the above saponification is effected at pressures in the range of about 0.01 to about 100 atmospheres. Sufficient time should be employed to effect the degree of saponification desired. Normally, reaction times in the range of about 1 minute to about 16 hours are suitable.

The base employed in the above saponification can be any base known to be useful to effect the saponification of an ester or thiolester linkage. For example, alkali metal hydroxides such as sodium hydroxide, potassium hydroxide, lithium hydroxide, or the like can be employed. Also, basic materials such as basic clays, basic ion exchange resins, and the like can be employed if desired.

It is also within the scope of this invention to effect the above saponification, or in this embodiment more accurately termed hydrolysis, in the presence of an acidic hydrolysis catalyst, provided some means is employed to remove the carboxylic acid formed, such as fractional distillation, solvent extraction, the like, or any other means known to the art.

The novel compositions, 1,5,10-decanetrithiol and the 1,5,10-decanetriyl triscarbothiolates, which are formed in the above conversions can be separated from any reaction by-products, diluents, or the like by any means known to the art such as distillation, solvent extraction, chromatography, filtration, or the like.

1,5,10-decanethithiol is useful as a crosslinking agent in the curing of polythiol polymers, and is a crosslinking agent in the curing of polythiol polymers, and is a crosslinking curative for epoxy resins. Use as a crosslinking agent for polythiol polymers is demonstrated in the copending application of O. L. Marrs, Ser. No. 705,941 filed Feb. 16, 1968.

The following example will further illustrate the present invention, but it is not intended that the invention be limited to the specific embodiments shown therein.

Example I

To a stirred reactor was charged 100 g. (1.3 moles) of thiolacetic (methanecarbothiolic acid) acid. A total of 50 g. (0.37 mole) of 1,5,9-decatriene was then slowly added to the stirred reactor contents at such rates that the temperature rise could be controlled below the boiling point of the reactor contents. Upon addition of all the 1,5,9-decatriene and cessation of heat evolution the mixture was heated at 110° C. and maintained at the temperature for 30 minutes.

Upon cooling, the reaction product was dissolved in 250 ml. of a composition comprised of 95 weight percent methanol and 5 weight percent water. To the mixture was then added 100 ml. of water and 60 g. (1.5 moles) of NaOH in increments. Temperature was maintained below the boiling point of the reactor contents with a water bath. Upon cessation of heat evolution, the mixture was brought to gentle reflux temperature and maintained at that temperature for about 1 hour. Upon cooling, the reactor contents were poured into a mixture comprised of ice and hydrochloric acid. The total mixture was then extracted with ethyl ether, the ether extract was washed with water, the either extract was dried over magnesium sulfate, and the ether extract was stripped of volatiles to yield 85 gms. of product. Infrared analysis indicated carbothiolate linkages.

The product was stirred into a mixture comprised of 250 ml. ethanol, 100 ml. water, and 40 g. NaOH. The resultant mixture was stirred and refluxed for two hours and subsequently extracted with ether. The ether extract was washed with water, dried over $MgSO_4$, and stripped as before to yield a product which exhibited no carbothiolate linkages upon infrared analysis.

This product was distilled at reduced pressure to yield 62.4 g. of the purified 1,5,10-decanetrithiol product (approximately 71 mole percent yield based on the 1,5,9-decatriene charged), B.P. 105–147° C./0.3–0.45 mm. Hg. Elemental composition calculated for 1,5,10-decanetrithiol is 50.5% carbon, 9.2% hydrogen, 40.3% sulfur. Elemental composition found upon analysis of the above 1,5,10-decanetrithiol product was 50.9% carbon, 9.2% hydrogen, and 39.3% sulfur.

This example demonstrates the synthesis of 1,5,10-decanetrithiol according to a presently preferred embodiment of the invention comprising the conversion of 1,5,9-decatriene and a carbothiolic acid to a 1,5,10-decanetriyl triscarbothiolate with subsequent saponification.

Reasonable variations and modifications may be made or followed in the light of the foregoing disclosure and discussion without departing from the spirit or scope thereof.

We claim:
1. 1,5,10-decanetrithiol.

References Cited

Reid: "Chem. Bivalent Sulfur," vol. 1, p. 30 (1958).

CHARLES B. PARKER, Primary Examiner

D. R. PHILLIPS, Assistant Examiner

U.S. Cl. X.R.

260—79.7, 455